US012663636B2

(12) United States Patent
Lee et al.

(10) Patent No.: US 12,663,636 B2
(45) Date of Patent: Jun. 23, 2026

(54) HEAD UP DISPLAY DEVICE

(71) Applicant: Coretronic Corporation, Hsin-Chu (TW)

(72) Inventors: Po-Che Lee, Hsin-Chu (TW); Shih-Yi Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 378 days.

(21) Appl. No.: 18/319,461

(22) Filed: May 17, 2023

(65) Prior Publication Data

US 2023/0375821 A1      Nov. 23, 2023

Related U.S. Application Data

(60) Provisional application No. 63/344,045, filed on May 20, 2022.

(30) Foreign Application Priority Data

Aug. 9, 2022      (CN) ......................... 202210948785.X

(51) Int. Cl.
G02B 26/02          (2006.01)
G01J 5/10          (2006.01)
          (Continued)

(52) U.S. Cl.
CPC ................ G02B 26/02 (2013.01); G01J 5/10 (2013.01); G02B 27/0006 (2013.01);
          (Continued)

(58) Field of Classification Search
CPC ................ G02B 26/02; G02B 27/0006; G02B 27/0101; G02B 27/1006; G02B 27/14;
          (Continued)

(56) References Cited

U.S. PATENT DOCUMENTS 9,580,015 B2      2/2017   Aboshi
10,656,415 B2      5/2020   Kuzuhara et al.
          (Continued)

FOREIGN PATENT DOCUMENTS

CN          108292047          7/2018
CN          108919496          11/2018
          (Continued)

OTHER PUBLICATIONS

"Office Action of China Related Application, Application No. 202111346454.0", issued on Apr. 10, 2025, p. 1-p. 7.
          (Continued)

*Primary Examiner* — James C. Jones
(74) *Attorney, Agent, or Firm* — JCIPRNET

(57)          ABSTRACT

A head up display device includes an image generation unit, an imaging unit, an infrared light splitting element, and at least one infrared light detecting element. The infrared light splitting element is located on a transmission path of at least one ambient light beam, and configured to split an infrared light beam from the at least one ambient light beam. The at least one infrared light detecting element is located on a transmission path of the infrared light beam of the at least one ambient light beam, and configured to detect light intensity of the infrared light beam. When the at least one infrared light detecting element detects that the light intensity of the infrared light beam exceeds a predetermined threshold, the head up display device reduces light intensity of a portion of the at least one ambient light beam transmitted to the image generation unit.

14 Claims, 6 Drawing Sheets

(51) Int. Cl.

| | | |
|---|---|---|
| *G02B 27/00* | (2006.01) |
| *G02B 27/01* | (2006.01) |
| *G02B 27/10* | (2006.01) |
| *G02B 27/14* | (2006.01) |
| *G02F 1/01* | (2006.01) |

(52) U.S. Cl.
CPC ..... *G02B 27/0101* (2013.01); *G02B 27/1006* (2013.01); *G02B 27/14* (2013.01); *G02F 1/0136* (2013.01); *G02B 2027/0118* (2013.01)

(58) Field of Classification Search
CPC ... G02B 2027/0118; G02B 5/208; G01J 5/10; G02F 1/0136
See application file for complete search history.

(56) References Cited

U.S. PATENT DOCUMENTS

| | | | |
|---|---|---|---|
| 10,901,207 B2 | 1/2021 | Choi et al. |
| 2012/0105808 A1 | 5/2012 | Feng et al. |
| 2015/0098029 A1 | 4/2015 | Sato et al. |
| 2017/0199381 A1 | 7/2017 | Kuwabara |
| 2018/0348515 A1 | 12/2018 | Kuzuhara et al. |
| 2019/0258059 A1 | 8/2019 | Takahashi |
| 2019/0265472 A1 | 8/2019 | Sugiyama et al. |
| 2020/0012099 A1 | 1/2020 | Kim et al. |
| 2020/0026073 A1 | 1/2020 | Nambara |
| 2020/0124848 A1 | 4/2020 | Habermehl |
| 2021/0325670 A1 | 10/2021 | Chen |
| 2021/0356774 A1 | 11/2021 | Nakanishi |
| 2022/0121028 A1 | 4/2022 | Smeeton et al. |
| 2022/0201043 A1 | 6/2022 | Pugalia et al. |
| 2023/0025573 A1 | 1/2023 | Lin et al. |
| 2023/0194867 A1* | 6/2023 | McGrath ................ H04N 23/10 348/259 |

FOREIGN PATENT DOCUMENTS

| | | | | |
|---|---|---|---|---|
| CN | 110908124 | | 3/2020 | |
| CN | 210348084 | | 4/2020 | |
| CN | 112255810 | | 1/2021 | |
| CN | 112444982 | | 3/2021 | |
| CN | 112835198 | | 5/2021 | |
| CN | 114063287 | A | 2/2022 | |
| CN | 114063291 | | 2/2022 | |
| CN | 114063291 | A * | 2/2022 | ......... G02B 27/0101 |
| CN | 114077065 | | 2/2022 | |
| CN | 114460744 | | 5/2022 | |
| DE | 102005020233 | | 11/2006 | |
| EP | 3525038 | | 8/2019 | |
| JP | H06885 | | 1/1994 | |
| JP | 2007148163 | | 6/2007 | |
| JP | 2018049179 | | 3/2018 | |
| JP | 2018084596 | | 5/2018 | |
| JP | 2019028373 | | 2/2019 | |
| JP | 2020095191 | | 6/2020 | |
| JP | 2020129069 | | 8/2020 | |
| JP | 2020144306 | | 9/2020 | |
| KR | 20180097338 | | 8/2018 | |
| TW | 201805693 | | 2/2018 | |
| TW | 201837539 | | 10/2018 | |
| TW | 202030520 | | 8/2020 | |
| WO | 2019093079 | | 5/2019 | |
| WO | 2020071176 | | 4/2020 | |
| WO | 2021065820 | | 4/2021 | |

OTHER PUBLICATIONS

"Office Action of Korea Related Application, Application No. 10-2022-0085175", issued on Jun. 24, 2024, p. 1-p. 7.

"Search Report of Europe Counterpart Application", issued on Nov. 2, 2023, p. 1-p. 7.

Toyobo Co.,Ltd, "Toyobo product: Cosmoshine SRF® (Super Retardation Film)", retrieved on Aug. 27, 2021, pp. 1-3. Available at: https://www.toyobo-global.com/seihin/film/kogyo/optics/optics_03.html.

3M Display Materials & Systems Divsion, "3M Product: Visible-light Reflective PGU (VRP)", 2021 Technical Data, 2021, pp. 1-2.

Anonymous, "Liquid-crystal display—Wikipedia", retrieved on Nov. 15, 2022, pp. 1-3. Available at: https://web.archive.org/web/20210205132316/https://en.wikipedia.org/wiki/Liquidcrystal_display.

"Office Action of U.S. Related Application, U.S. Appl. No. 17/838,274", issued on Jul. 14, 2023, p. 1-p. 13.

"Office Action of Japan Related Application, Application No. 2022-096418", issued on Sep. 9, 2025, p. 1-p. 7.

"Office Action of Europe counterpart Application", issued on Dec. 16, 2025, p. 1-p. 5.

\* cited by examiner

HEAD UP DISPLAY DEVICE

CROSS-REFERENCE TO RELATED APPLICATION

This application claims the priority benefits of U.S. provisional application Ser. No. 63/344,045, filed on May 20, 2022 and Chinese application no. 202210948785.X, filed on Aug. 9, 2022. The entirety of each of the above-mentioned patent applications is hereby incorporated by reference herein and made a part of this specification.

BACKGROUND

Technical Field

The disclosure relates to a head up display device. In particular, the disclosure relates to a head up display device detecting infrared beam energy of an ambient light beam.

Description of Related Art

In recent years, development of display technology has driven a large number of applications of head up display devices to daily life, among which head up display devices are typically applied to aircrafts, vehicles, shop windows, and the like. Taking a head up display device for a vehicle as an example, an inner surface of a windshield is used as an optical combiner providing a driver with information. During a drive, the driver can see the information provided by the in-vehicle information system without heading down to look at a dashboard or a navigator.

Since the head up display device is mostly used in outdoor fields, the sunlight may converge on an internal display panel through an imaging lens group of the head up display device, which may cause a temperature of the display panel to be higher than an upper limit (about 100 degrees to 110 degrees) that the display panel can withstand. Generally speaking, light energy density of the sunlight is 1,050 W/m², and the light energy density may be greater than 20,000 W/m² to 60,000 W/m² when the sunlight converges on a small area of the display panel, causing the temperature of the display panel to be higher than 105 degrees, thus damaging the display panel and reducing the service life of the head up display device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a head up display device, which may indicate that an ambient light beam converges to an image generation unit and take corresponding protective measures to prevent the head up display device from being damaged by illumination of a great number of ambient light beams.

To achieve one, some, or all of the above objectives or other objectives, an embodiment of the disclosure proposes a head up display device. The head up display device includes an image generation unit, an imaging unit, an infrared light splitting element, and at least one infrared light detecting element. The image generation unit is configured to provide an image light beam. The imaging unit is located on a transmission path of the image light beam. The infrared light splitting element is located on a transmission path of at least one ambient light beam, and configured to split an infrared light beam from the at least one ambient light beam. The at least one infrared light detecting element is located on a transmission path of the infrared light beam of the at least one ambient light beam, and configured to detect light intensity of the infrared light beam. The head up display device is configured to reduce light intensity of a portion of the at least one ambient light beam transmitted to the image generation unit when the at least one infrared light detecting element detects that the light intensity of the infrared light beam exceeds a predetermined threshold.

In an embodiment of the disclosure, the predetermined threshold is 20 μW.

In an embodiment of the disclosure, the infrared light splitting element is configured to reflect a light beam with a wavelength greater than 700 nm.

In an embodiment of the disclosure, the infrared light splitting element is disposed to prevent the infrared light beam of the at least one ambient light beam from being transmitted to the image generation unit.

In an embodiment of the disclosure, the image light beam departing from the head up display device is transmitted to a reflecting screen. The image light beam is reflected on the reflecting screen into an eye of a user to display a virtual image. The infrared light splitting element is disposed between the reflecting screen and the image generation unit.

In an embodiment of the disclosure, the infrared light splitting element is configured to isolate dust from falling into the head up display device.

In an embodiment of the disclosure, the infrared light splitting element is located in the imaging unit.

In an embodiment of the disclosure, the infrared light splitting element is disposed between the reflecting screen and the imaging unit.

In an embodiment of the disclosure, the infrared light splitting element is disposed between the imaging unit and the image generation unit.

In an embodiment of the disclosure, the at least one ambient light beam includes a plurality of ambient light beams. The infrared light beams of the ambient light beams are incident onto the infrared light splitting element in different incident directions and depart from the infrared light splitting element in different emitting directions. The at least one infrared light detecting element includes a plurality of infrared light detecting elements respectively disposed corresponding to the different emitting directions of the infrared light beams of the ambient light beams.

In an embodiment of the disclosure, the at least one ambient light beam includes a plurality of ambient light beams. The infrared light beams of the ambient light beams are incident onto the infrared light splitting element in different incident directions and depart from the infrared light splitting element in different emitting directions. The number of the at least one infrared light detecting element is one. The head up display device further includes a converging lens. The converging lens is configured to converge the infrared light beams of the ambient light beams to be incident onto the infrared light detecting element.

In an embodiment of the disclosure, the head up display device further includes a protection system. The protection system includes a light-shielding element. The head up display device is configured to reduce the light intensity of the portion of the at least one ambient light beam transmitted to the image generation unit by activating the protection system to switch the light-shielding element to move onto the transmission path of the at least one ambient light beam.

In an embodiment of the disclosure, the head up display device further includes a protection system. The protection system includes a light beam modulating device disposed in the head up display device. The head up display device is configured to reduce the light intensity of the portion of the at least one ambient light beam transmitted to the image generation unit by activating the protection system to switch the light beam modulating device to move onto the transmission path of the at least one ambient light beam, such that light energy of the at least one ambient light beam after passing through the light beam modulating device is less than or equal to 25% of light energy of the at least one ambient light beam before being incident on the light beam modulating device.

In an embodiment of the disclosure, the light beam modulating device includes a first linear polarizer, a phase modulator, and a second linear polarizer sequentially disposed on the transmission path of the at least one ambient light beam incident on the image generation unit.

In an embodiment of the disclosure, the head up display device is configured to reduce the light intensity of the portion of the at least one ambient light beam transmitted to the image generation unit by turning off the image generation unit.

Based on the foregoing, in the embodiments of the disclosure, by disposing the infrared light splitting element and the infrared light detecting element, the head up display device may detect the situation that the ambient light beam converges to the image generation unit and take corresponding protective measures to prevent the head up display device from being damaged by illumination of a great number of ambient light beams.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
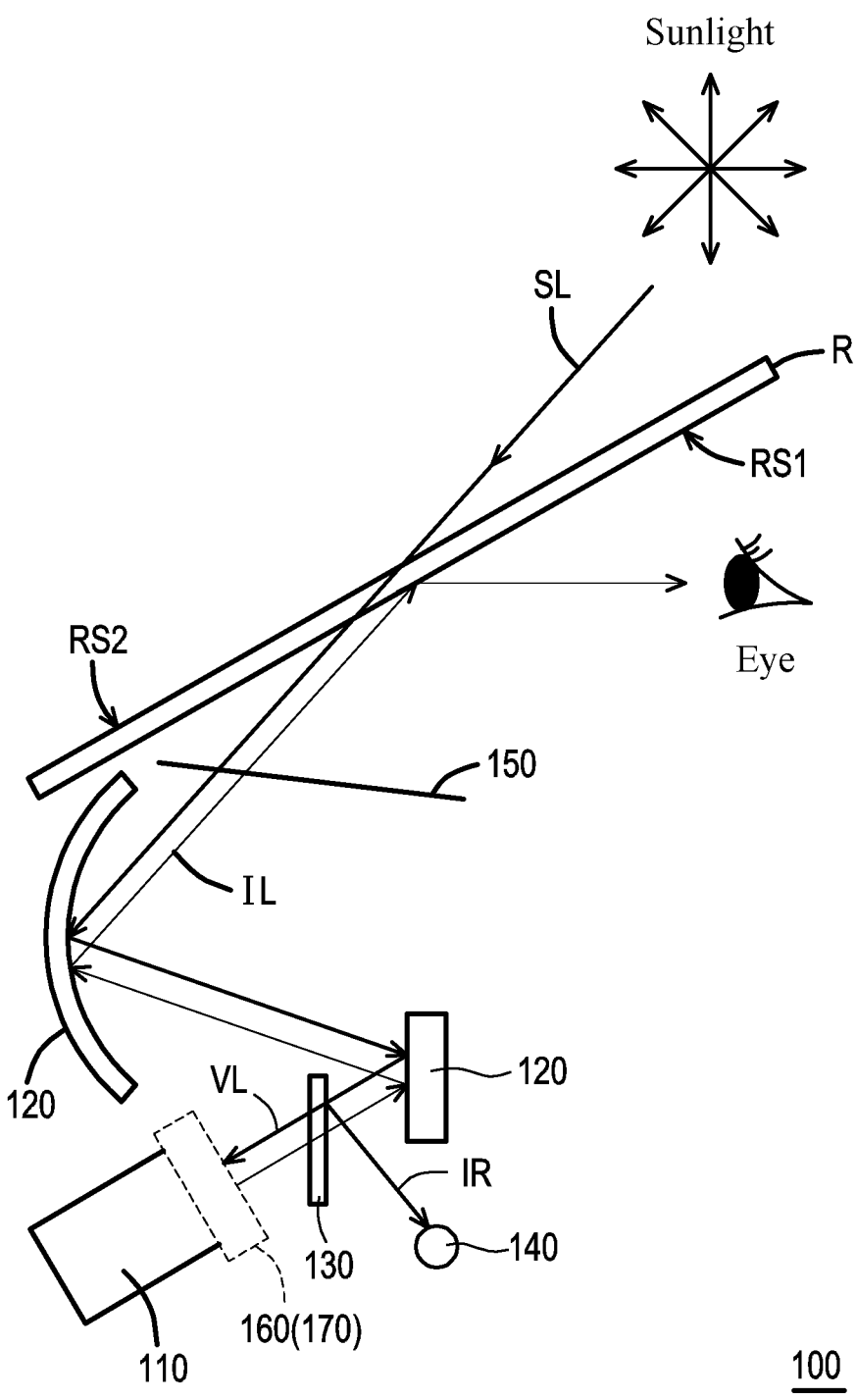
FIG. 1A is a schematic architectural diagram of a head up display device of an embodiment of the disclosure.
Figure 1B:
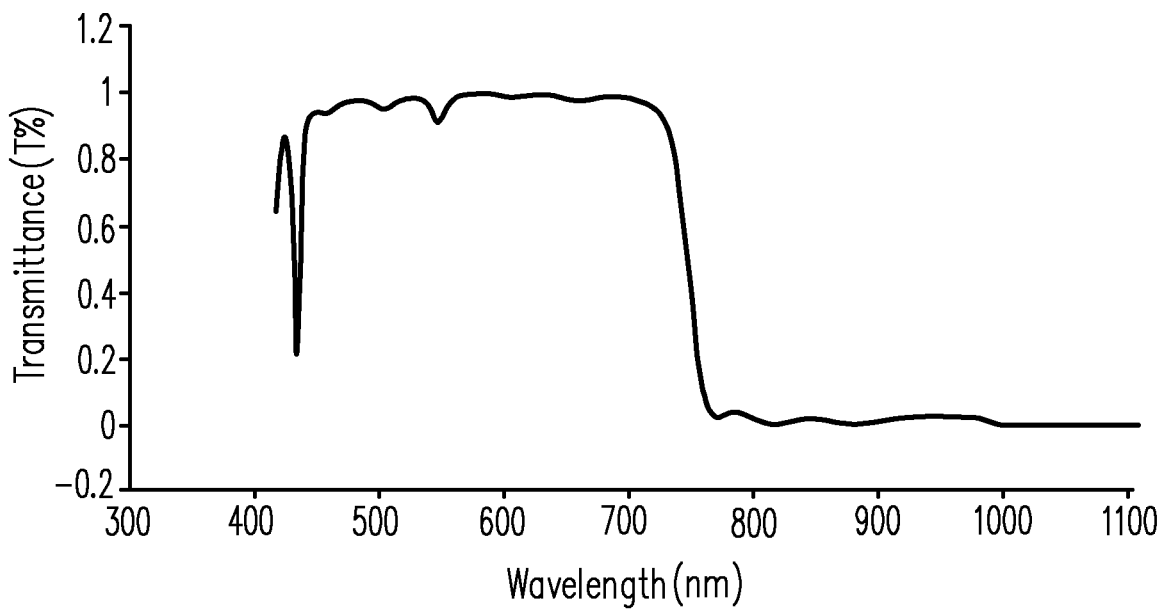
FIG. 1B is a spectral line chart of a transmittance of an infrared light splitting element of FIG. 1A.

FIG. 1A is a schematic architectural diagram of a head up display device of an embodiment of the disclosure. FIG. 1B is a spectral line chart of a transmittance of an infrared light splitting element of FIG. 1A. Please refer to FIG. 1A, in this embodiment, a head up display device 100 includes an image generation unit 110, an imaging unit 120, an infrared light splitting element 130, and at least one infrared light detecting element 140. The image generation unit 110 is configured to provide an image light beam IL, and the image generation unit 110 is, for example, a display panel. For example, the display panel may be a transparent liquid crystal panel, reflective-type liquid crystal on silicon (LCOS), or a digital micro-mirror device (DMD). The imaging unit 120 is located on a transmission path of the image light beam IL, and is disposed between the image generation unit 110 and an eye of a user.

For example, in this embodiment, the imaging unit 120 of the head up display device 100 may include at least one of a plane mirror, a convex mirror, or a concave mirror, and the required mirror may be disposed depending on the design of the optical path of the image light beam IL, such that the image light beam IL of the image generation unit 110 is guided by the imaging unit 120 and transmitted to a reflecting screen R. In this embodiment, the reflecting screen R is a windshield, for example. A surface RS1 of the reflecting screen R corresponds to a surface of a windshield inside a car, and a surface RS2 corresponds to a surface of the windshield outside the car. The image light beam IL is reflected on the surface RS1 of the reflecting screen R into eyes of a driver, and a virtual image is displayed in front of the eyes of the driver.

In addition, the head up display device 100 further includes a dust cover 150. In this embodiment, for example, the dust cover 150 is a light-transmitting plastic cover, and the material thereof is polyethylene terephthalate (PET). The dust cover 150 is configured to isolate dust from falling into the head up display device 100. In other words, dust may not touch the image generation unit 110, and it is possible to prevent influences on the image quality.

To prevent the image generation unit 110 from damage due to a high temperature when an ambient light beam SL (e.g., sunlight) enters the head up display device 100 and illuminates the image generation unit 110, in this embodiment, the infrared light splitting element 130 may be disposed on a transmission path of the ambient light beam SL and may be configured to divide the ambient light beam SL into an infrared light beam IR and a visible light beam VL, specially, the infrared light splitting element 130 is configured to reflect the infrared light beam IR and allow the visible light beam VL pass through. Further, as shown in FIG. 1A, in this embodiment, the infrared light splitting element 130 is configured to prevent the infrared light beam IR of the ambient light beam SL from being transmitted to the image generation unit 110. For example, the infrared light splitting element 130 may be disposed between the imaging unit 120 and the image generation unit 110. Moreover, as shown in FIG. 1B, an infrared light splitting element capable of reflecting a light beam with a wavelength greater than 780 nm may be adopted for the infrared light splitting element 130. As such, most of light energy of the ambient light beam SL transmitted to the image generation unit 110 may be reduced, and the probability of damage to the head up display device 100 due to long-term illumination by the ambient light beam SL may be reduced.

Figure 1C:
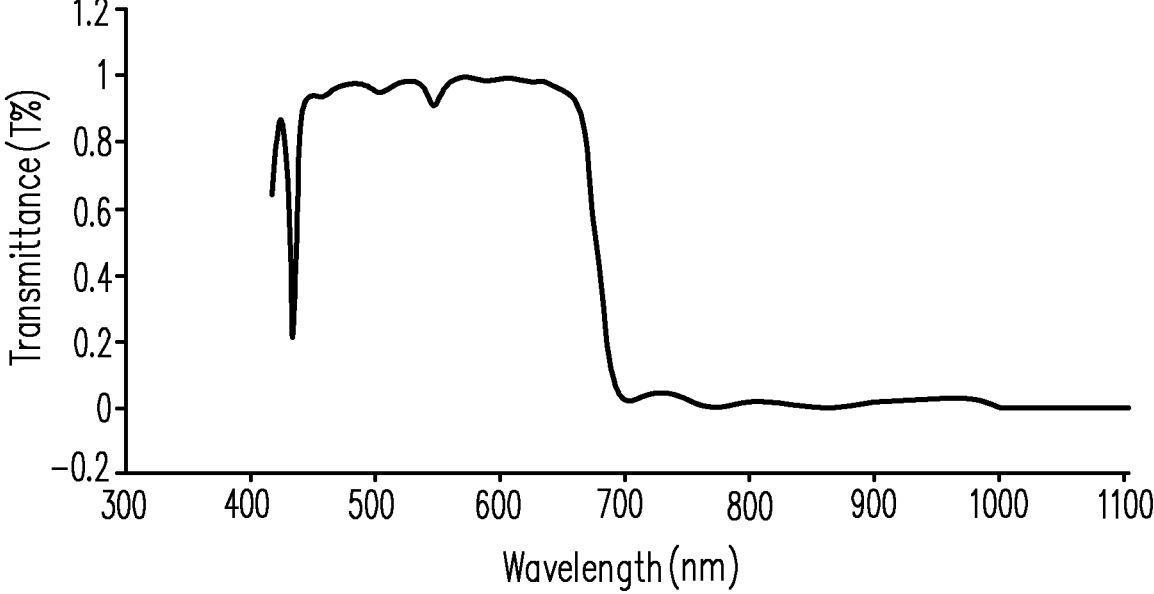
FIG. 1C is a spectral line chart of a transmittance of another infrared light splitting element of FIG. 1A.

In addition, as shown in FIG. 1C, an infrared light splitting element capable of reflecting a light beam with a wavelength greater than 700 nm may also be adopted for the infrared light splitting element 130. As such, most of the light energy of the ambient light beam SL transmitted to the image generation unit 110 may also be reduced, and the probability of damage to the head up display device 100 due to long-term illumination by the ambient light beam SL may be reduced.

Moreover, as shown in FIG. 1A, in this embodiment, the infrared light beam IR and the visible light beam VL of the ambient light beam SL are respectively emitted from two sides of the infrared light splitting element 130. After passing through the infrared light splitting element 130, the visible light beam VL of the ambient light beam SL is transmitted to the image generation unit 110, and may therefore cause damage when light intensity (light energy) of the visible light beam VL transmitted to the image generation unit 110 exceeds a maximum intensity that the image generation unit 110 may withstand.

Further, light intensity of the infrared light beam IR is proportional to the light intensity of the visible light beam VL of the at least one ambient light beam SL. Therefore, in this embodiment, through detecting the light intensity of the infrared light beam IR of each of the at least one ambient light beam SL by the at least one infrared light detecting element 140 correspondingly disposed on a transmission path of the infrared light beam IR of each of the at least one ambient light beam SL, the head up display device 100 may determine whether the light intensity of the visible light beam VL transmitted to the image generation unit 110 reaches an intensity that may damage the display panel of the image generation unit 110. Moreover, when the at least one infrared light detecting element 140 detects that the light intensity of the infrared light beam IR of the corresponding at least one ambient light beam SL exceeds a predetermined threshold, the head up display device 100 may activate a protection system to reduce light intensity of a portion of the at least one ambient light beam SL transmitted to the image generation unit 110. For example, in this embodiment, the predetermined threshold is 20 microwatts (μW).

For example, in this embodiment, the protection system includes a light-shielding element 160 or a light beam modulating device 170. The head up display device 100 is configured to reduce the light intensity of a portion of the at least one ambient light beam SL transmitted to the image generation unit 110 by activating the protection system to switch the light-shielding element 160 or the light beam modulating device 170 to move onto the transmission path of the at least one ambient light beam SL. For example, as shown in FIG. 1A, in this embodiment, the light-shielding element 160 or the light beam modulating device 170 may be disposed at a position in front of the image generation unit 110, but the disclosure is not limited thereto. In other embodiments not shown, the light-shielding element 160 may be located on the dust cover 150, disposed between the reflecting screen R and the image generation unit 110, or located on other transmission paths of the visible light beam VL of the at least one ambient light beam SL as long as the light-shielding element 160 may shield the visible light beam VL of the at least one ambient light beam SL from entering the image generation unit 110.

For example, in this embodiment, the light-shielding element 160 may be a light shield or any element that can shield the visible light beam VL from passing through. In addition, the light beam modulating device 170 may be a sunlight filter (SLF), such that light energy of the at least one ambient light beam SL after passing through the light beam modulating device 170 is less than or equal to 25% of light energy of the at least one ambient light beam SL before being incident on the light beam modulating device 170.

Further, in this embodiment, the light beam modulating device 170 may include a first linear polarizer, a phase modulator, and a second linear polarizer (not shown), which are sequentially disposed on the transmission path of the at least one ambient light beam SL incident on the image generation unit 110. Specifically, the ambient light beam SL belongs to unpolarized light. It should be noted that unpolarized light has a polarization direction that changes rapidly with time instead of not having a polarization direction. After the ambient light beam SL passes through the first linear polarizer, a portion of the ambient light beam SL whose polarization direction is parallel to the absorption axis of the first linear polarizer is absorbed by the first linear polarizer, and a portion of the ambient light beam SL transmitted through the first linear polarizer is linearly polarized. Polarized light may be S-polarized or P-polarized. Generally speaking, the light energy of the absorbed portion of the ambient light beam SL accounts for about 50% of the light energy of the original ambient light beam SL. In other words, the light energy of the portion of the ambient light beam SL transmitted through the first linear polarizer accounts for about 50% of the light energy of the original ambient light beam SL. The phase modulator is disposed between the first linear polarizer and the second linear polarizer, and the phase modulator is configured to modulate the phase of the portion of the ambient light beam SL transmitted through the first linear polarizer to change the polarization state of the portion of the ambient light beam SL from linear polarization to other polarization states, for example, circularly polarized, elliptically polarized, or unpolarized. For example, the phase modulator may be a quarter-wave plate, and an angle may be formed between the transmission axis of the first linear polarizer and the slow axis of the quarter-wave plate. The polarization state of the ambient light beam SL is changed to elliptically polarized when the angle is greater than 0 degrees and less than 45 degrees, and the polarization state of the ambient light beam SL is changed to circularly polarized when the angle is 45 degrees. Alternatively, the phase modulator may be a depolarizer causing a portion of the ambient light beam SL transmitted through the phase modulator to be unpolarized. In turn, by appropriately arranging the direction of the absorption axis of the second linear polarizer, 50% of the light energy of the portion of the ambient light beam SL is absorbed. As such, the light energy of the portion of the ambient light beam SL after transmitted through the light beam modulating device 170 is less than or equal to 25% of the light energy of the ambient light beam SL before transmitted through the light beam modulating device 170.

Furthermore, in this embodiment, the head up display device 100 may also reduce the light intensity of a portion of the at least one ambient light beam SL transmitted to the image generation unit 110 by turning off the image generation unit 110 to prevent the display panel of the image generation unit 110 from damage during operation.

Accordingly, by disposing the infrared light splitting element 130 and the infrared light detecting element 140, the head up display device 100 may detect the situation that the ambient light beam converges to the image generation unit 110 and take corresponding protective measures to prevent the head up display device 100 from being damaged by illumination of a great number of ambient light beams.

It is worth noting that, although the infrared light splitting element 130 being disposed between the imaging unit 120 and the image generation unit 110 is taken as an example in the embodiments above, the disclosure is not limited thereto. In other embodiment, the infrared light splitting element 130 may be disposed at other positions as long as the infrared light splitting element 130 is located on the transmission path of the at least one ambient light beam SL. Further description accompanied with FIG. 2 to FIG. 4 will be provided below.

Figure 2:
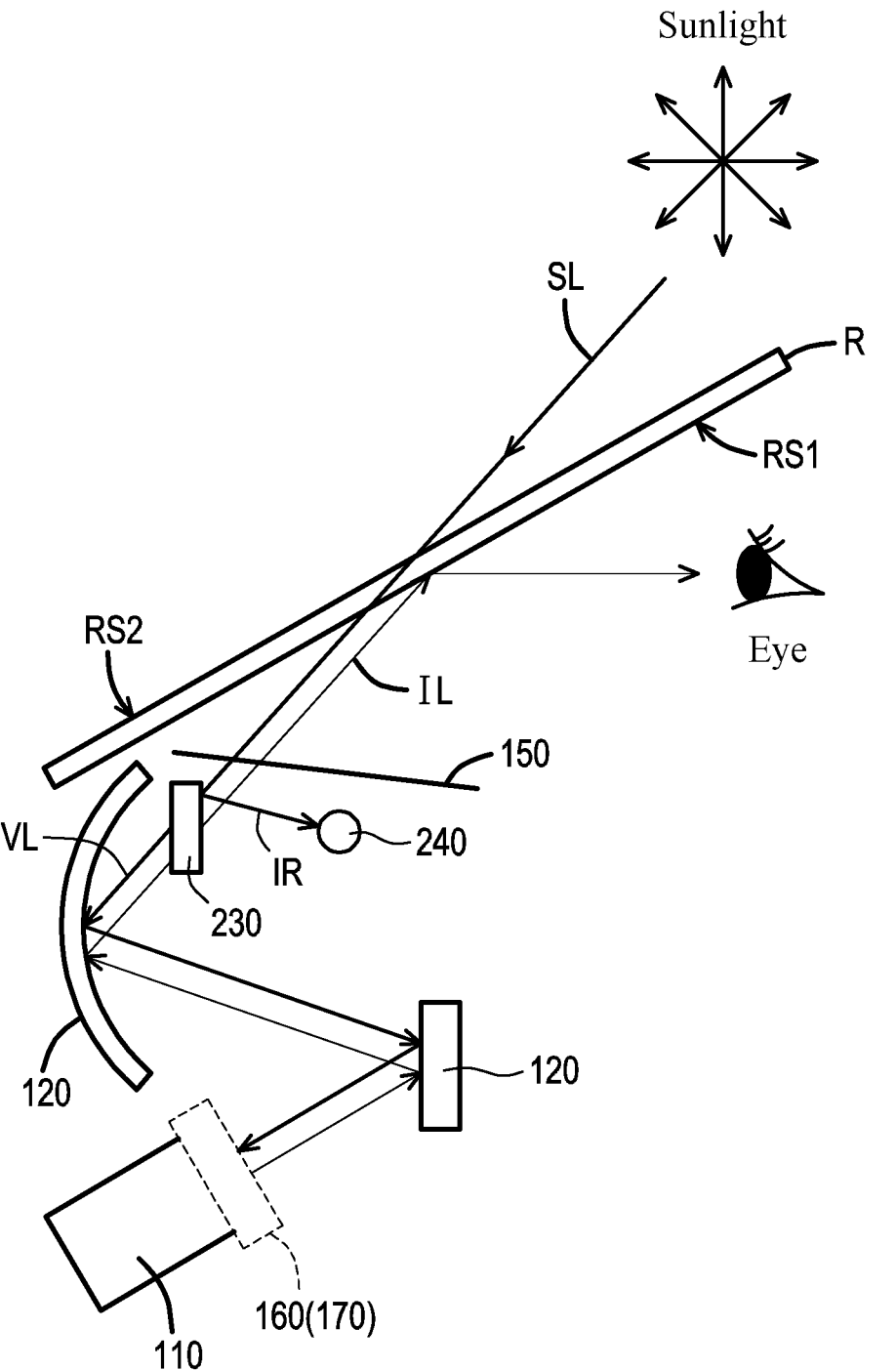
FIG. 2 to FIG. 4 are schematic architectural diagrams of head up display devices of different embodiments of the disclosure.
Figure 3:
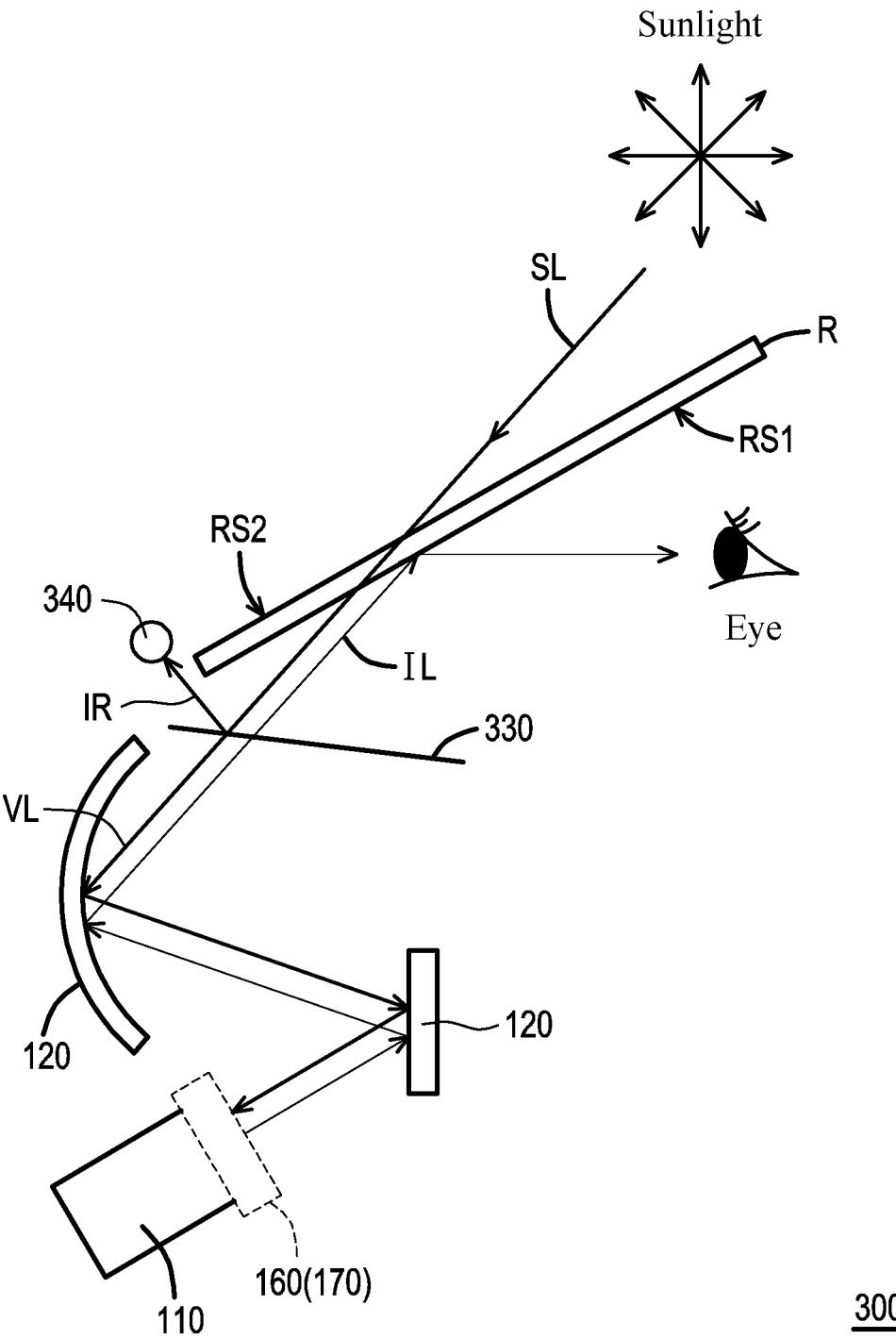
Figure 4:
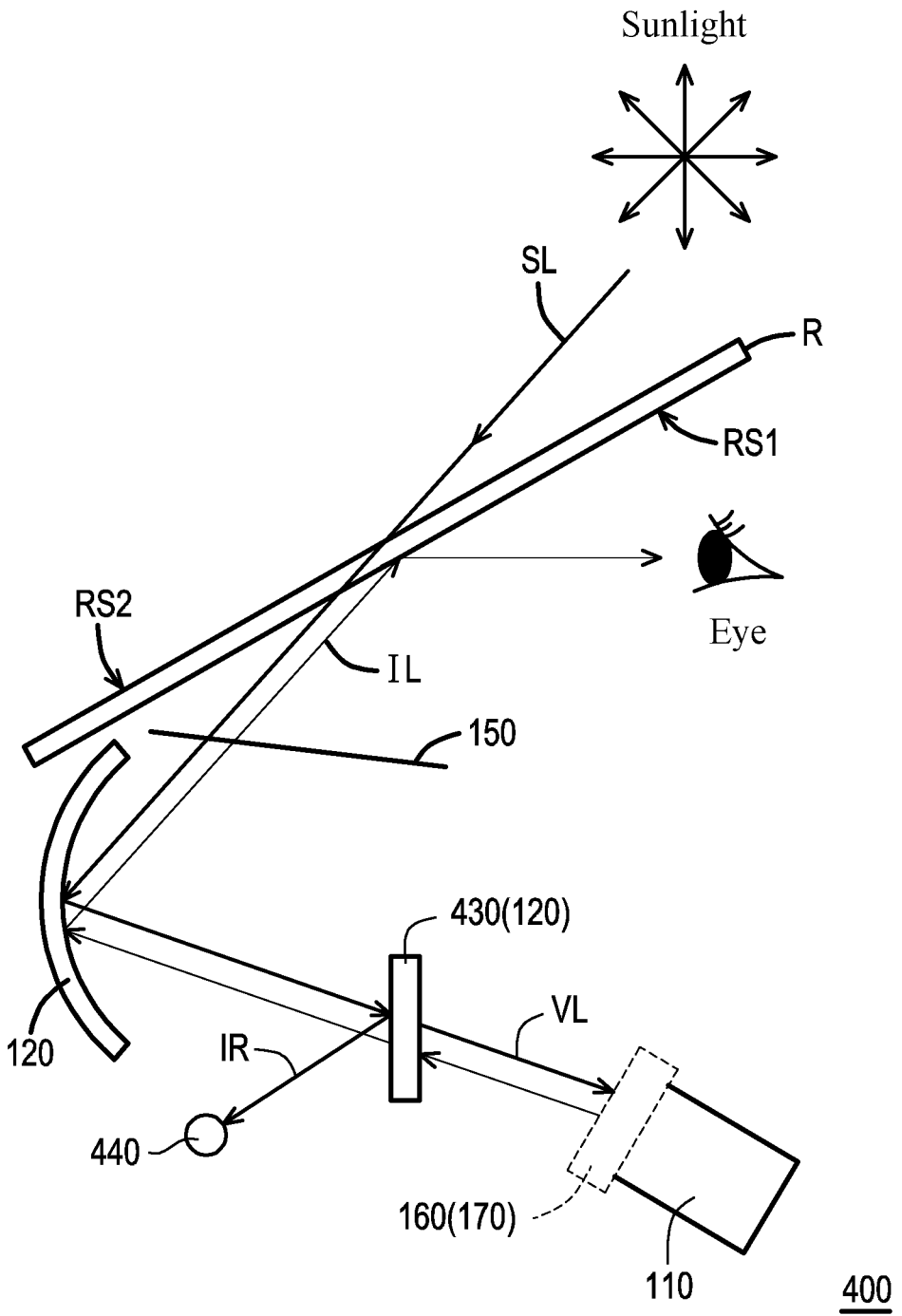

FIG. 2 to FIG. 4 are schematic architectural diagrams of head up display devices of different embodiments of the disclosure. Please refer to FIG. 2 to FIG. 4, head up display devices 200, 300, and 400 are similar to the head up display device 100 of FIG. 1, and the differences are described as follows. As shown in FIG. 2, in this embodiment, an infrared light splitting element 230 of the head up display device 200 may be disposed between the reflecting screen R and the imaging unit 120. In addition, as shown in FIG. 3, in this embodiment, an infrared light splitting element 330 of the head up display device 300 is disposed where the dust cover 150 is originally disposed in place of the dust cover 150, and the infrared light splitting element 330 may be configured to isolate dust from falling into the head up display device 300. As shown in FIG. 4, in this embodiment, an infrared light splitting element 430 is located in the imaging unit 120 and may be configured to allow the image light beam IL and the visible light beam VL pass through and also transmit the infrared light beam IR, serving as a cold mirror in the imaging unit 120.

As such, as shown in FIG. 2 to FIG. 4, although the infrared light splitting elements 230, 330, and 430 are disposed at different positions, the infrared light beam IR of each of the at least one ambient light beam SL may still be correspondingly transmitted to at least one infrared light detecting elements 240, 340, and 440. Furthermore, the light intensity of the infrared light beam IR is accordingly monitored to indicate the ambient light beam converges to the image generation unit 110. Moreover, corresponding protective measures are taken to prevent the head up display device 100 from being damaged by illumination of a great number of ambient light beams. As such, the head up display devices 200, 300 and 400 may also achieve similar effects and advantages as the head up display device 100, which will not be repeatedly described here.

In addition, it is worth noting that, although the ambient light beam SL being incident on the infrared light splitting elements 130, 230, 330, and 430 at the same angle is taken as an example in the embodiments above, the disclosure is not limited thereto. In other embodiments, for the ambient light beams SL incident on the infrared light splitting elements 130, 230, 330, and 430 at different angles, the number of optical elements or the number of the infrared light detecting elements 140, 240, 340, and 440 may also be correspondingly increased to correspondingly monitor the light intensity of each infrared light beam IR. Further description accompanied with FIG. 5A and FIG. 5B will be provided below.

Figure 5A:
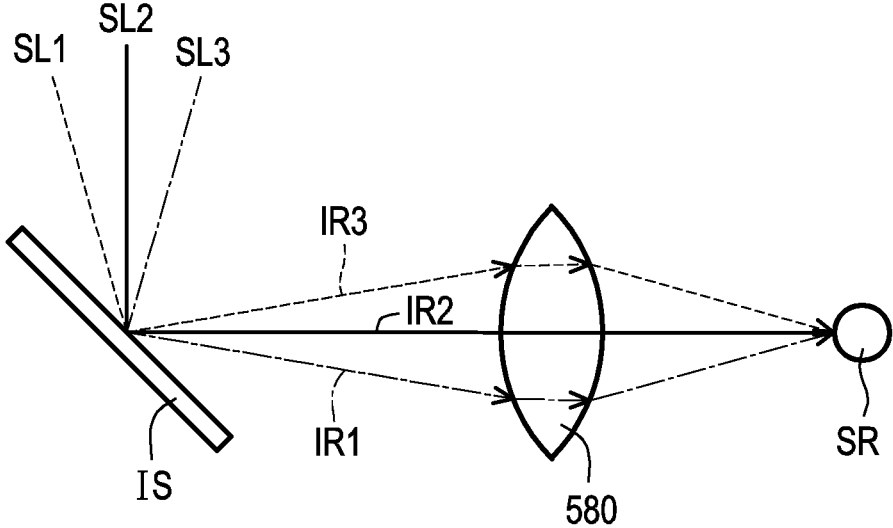
FIG. 5A and FIG. 5B are schematic configurational diagrams of infrared light splitting elements and infrared light detecting elements of different embodiments of the disclosure.
Figure 5B:
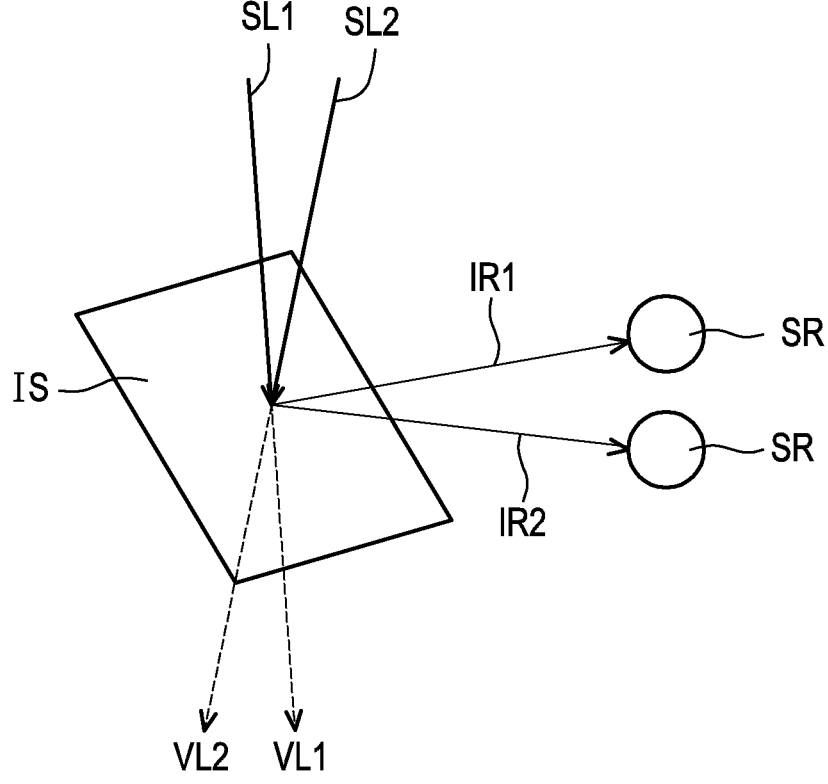

FIG. 5A and FIG. 5B are schematic configurational diagrams of infrared light splitting elements and infrared light detecting elements of different embodiments of the disclosure. For example, as shown in FIG. 5A, in this embodiment, when the at least one ambient light beam SL includes a plurality of ambient light beams SL1, SL2, and SL3 incident on an infrared light splitting element IS in different incident directions, infrared light beams IR1, IR2, and IR3 included in each ambient light beam SL and the visible light beams VL1 and VL2 (as shown in FIG. 5B) depart from the infrared light splitting element IS in different emitting directions. At this time, the head up display device 100 may be provided with a converging lens 580 disposed on transmission paths of the infrared light beams IR1, IR2, and IR3 of the ambient light beams SL1, SL2, and SL3, such that the infrared light beams IR1, IR2, and IR3 may be converged to be incident on at least one infrared light detecting element SR. As such, in this embodiment, the number of the at least one infrared light detecting element SR may be a single one.

In addition, as shown in FIG. 5B, where no converging lens is disposed, a plurality of infrared light detecting elements SR may be correspondingly disposed corresponding to the number of the ambient light beams SL1 and SL2 incident on the infrared light splitting element IS in different incident directions, and the infrared light detecting elements SR may be respectively disposed corresponding to the different emitting directions of the infrared light beams IR1 and IR2 of the ambient light beam SL. As such, the infrared light beams IR1 and IR2 departing from the infrared light splitting element IS in different emitting directions may also be monitored.

As such, as shown in FIG. 5A and FIG. 5B, although the infrared light beams IR1, IR2, and IR3 depart from the infrared light splitting element IS in different emitting directions, they are all correspondingly transmitted to the at least one infrared light detecting element SR, and may be monitored. As such, when the relative configurations between the infrared light splitting element IS and the infrared light detecting element SR shown in FIG. 5A and FIG. 5B are applied to the head up display devices 100, 200, 300, and 400, the head up display devices 100, 200, 300, and 400 can also achieve similar effects and advantages, which will not be repeatedly described here.

In summary of the foregoing, in the embodiments of the disclosure, by disposing the infrared light splitting element and the infrared light detecting element, the head up display device may detect the situation that the ambient light beam converges to the image generation unit and take corresponding protective measures to prevent the head up display device from being damaged by illumination of a great number of ambient light beams.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head up display device comprising:
an image generation unit, configured to provide an image light beam;
an imaging unit, located on a transmission path of the image light beam;
an infrared light splitting element, located on a transmission path of at least one ambient light beam, and configured to split an infrared light beam from the at least one ambient light beam; and
at least one infrared light detecting element, located on a transmission path of the infrared light beam of the at least one ambient light beam, and configured to detect light intensity of the infrared light beam, wherein the head up display device is configured to reduce light intensity of a portion of the at least one ambient light beam transmitted to the image generation unit when the at least one infrared light detecting element detects that the light intensity of the infrared light beam exceeds a predetermined threshold;
the image light beam departing from the head up display device is transmitted to a reflecting screen, the image light beam is reflected on the reflecting screen into an eye of an user to display a virtual image, and the infrared light splitting element is disposed between the reflecting screen and the image generation unit.

2. The head up display device according to claim 1, wherein the predetermined threshold is 20 µW.

3. The head up display device according to claim 1, wherein the infrared light splitting element is configured to reflect a light beam with a wavelength greater than 700 nm.

4. The head up display device according to claim 1, wherein the infrared light splitting element is disposed to prevent the infrared light beam of the at least one ambient light beam from being transmitted to the image generation unit.

5. The head up display device according to claim 1, wherein the infrared light splitting element is configured to isolate dust from falling into the head up display device.

6. The head up display device according to claim 1, wherein the infrared light splitting element is located in the imaging unit.

7. The head up display device according to claim 1, wherein the infrared light splitting element is disposed between the reflecting screen and the imaging unit.

8. The head up display device according to claim 1, wherein the infrared light splitting element is disposed between the imaging unit and the image generation unit.

9. The head up display device according to claim 1, wherein the at least one ambient light beam comprises a plurality of ambient light beams, the infrared light beams of the ambient light beams are incident onto the infrared light splitting element in different incident directions and depart from the infrared light splitting element in different emitting directions, and the at least one infrared light detecting element comprises a plurality of infrared light detecting elements respectively disposed corresponding to the different emitting directions of the infrared light beams of the ambient light beams.

10. The head up display device according to claim 1, wherein the at least one ambient light beam comprises a plurality of ambient light beams, the infrared light beams of the ambient light beams are incident onto the infrared light splitting element in different incident directions and depart from the infrared light splitting element in different emitting directions, the number of the at least one infrared light detecting element is one, and the head up display device further comprises:
a converging lens configured to converge the infrared light beams of the ambient light beams to be incident onto the infrared light detecting element.

11. A head up display device comprising:
an image generation unit, configured to provide an image light beam;
an imaging unit, located on a transmission path of the image light beam;
an infrared light splitting element, located on a transmission path of at least one ambient light beam, and configured to split an infrared light beam from the at least one ambient light beam;

at least one infrared light detecting element, located on a transmission path of the infrared light beam of the at least one ambient light beam, and configured to detect light intensity of the infrared light beam, wherein the head up display device is configured to reduce light intensity of a portion of the at least one ambient light beam transmitted to the image generation unit when the at least one infrared light detecting element detects that the light intensity of the infrared light beam exceeds a predetermined threshold; and a protection system, the protection system comprising a light-shielding element, wherein the head up display device is configured to reduce the light intensity of the portion of the at least one ambient light beam transmitted to the image generation unit by activating the protection system to switch the light-shielding element to move onto the transmission path of the at least one ambient light beam.

12. A head up display device comprising:

an image generation unit, configured to provide an image light beam;

an imaging unit, located on a transmission path of the image light beam;

an infrared light splitting element, located on a transmission path of at least one ambient light beam, and configured to split an infrared light beam from the at least one ambient light beam;

at least one infrared light detecting element, located on a transmission path of the infrared light beam of the at least one ambient light beam, and configured to detect light intensity of the infrared light beam, wherein the head up display device is configured to reduce light intensity of a portion of the at least one ambient light beam transmitted to the image generation unit when the at least one infrared light detecting element detects that the light intensity of the infrared light beam exceeds a predetermined threshold; and a protection system, the protection system comprising a light beam modulating device disposed in the head up display device, wherein the head up display device is configured to reduce the light intensity of the portion of the at least one ambient light beam transmitted to the image generation unit by activating the protection system to switch the light beam modulating device to move onto the transmission path of the at least one ambient light beam, such that light energy of the at least one ambient light beam after passing through the light beam modulating device is less than or equal to 25% of light energy of the at least one ambient light beam before being incident on the light beam modulating device.

13. The head up display device according to claim 12, wherein the light beam modulating device comprises a first linear polarizer, a phase modulator, and a second linear polarizer sequentially disposed on the transmission path of the at least one ambient light beam incident on the image generation unit.

14. A head up display device comprising:

an image generation unit, configured to provide an image light beam;

an imaging unit, located on a transmission path of the image light beam;

an infrared light splitting element, located on a transmission path of at least one ambient light beam, and configured to split an infrared light beam from the at least one ambient light beam; and at least one infrared light detecting element, located on a transmission path of the infrared light beam of the at least one ambient light beam, and configured to detect light intensity of the infrared light beam, wherein the head up display device is configured to reduce light intensity of a portion of the at least one ambient light beam transmitted to the image generation unit when the at least one infrared light detecting element detects that the light intensity of the infrared light beam exceeds a predetermined threshold;

wherein the head up display device is configured to reduce the light intensity of the portion of the at least one ambient light beam transmitted to the image generation unit by turning off the image generation unit.

* * * * *